United States Patent
Allen et al.

(10) Patent No.: US 8,464,021 B2
(45) Date of Patent: Jun. 11, 2013

(54) ADDRESS CACHING STORED TRANSLATION

(75) Inventors: Walter Allen, Wellington, CO (US); Sunil Atri, Austin, TX (US); Robert France, Austin, TX (US)

(73) Assignee: Spansion LLC, Sunnyvale, CA (US)

(*) Notice: Subject to any disclaimer, the term of this patent is extended or adjusted under 35 U.S.C. 154(b) by 945 days.

(21) Appl. No.: 12/127,919

(22) Filed: May 28, 2008

(65) Prior Publication Data

US 2009/0300318 A1 Dec. 3, 2009

(51) Int. Cl.
*G06F 9/34* (2006.01)
*G06F 9/26* (2006.01)

(52) U.S. Cl.
USPC ............ 711/202; 711/103; 711/118; 711/221

(58) Field of Classification Search
USPC .......................................................... 711/202
See application file for complete search history.

(56) References Cited

U.S. PATENT DOCUMENTS

| | | | |
|---|---|---|---|
| 6,069,638 A * | 5/2000 | Porterfield | 345/568 |
| 6,686,920 B1 * | 2/2004 | Peck et al. | 345/557 |
| 8,032,699 B2 * | 10/2011 | Feldman et al. | 711/113 |
| 2001/0047451 A1 * | 11/2001 | Noble et al. | 711/111 |
| 2003/0196066 A1 | 10/2003 | Mathews | |
| 2004/0073768 A1 * | 4/2004 | Bottemiller et al. | 711/207 |
| 2005/0246487 A1 * | 11/2005 | Ergan et al. | 711/113 |
| 2005/0256838 A1 * | 11/2005 | Lasser | 707/1 |
| 2006/0230223 A1 * | 10/2006 | Kruger et al. | 711/6 |
| 2007/0050594 A1 | 3/2007 | Augsburg et al. | |
| 2008/0098195 A1 | 4/2008 | Cheon et al. | |
| 2008/0198651 A1 | 8/2008 | Kim | |
| 2009/0150646 A1 * | 6/2009 | Allen et al. | 711/213 |
| 2009/0172345 A1 * | 7/2009 | Allen et al. | 711/208 |

OTHER PUBLICATIONS

Non-Final OA dated Apr. 29, 2010 for U.S. Appl. No. 11/966,919, 26 pages.

* cited by examiner

*Primary Examiner* — Christian P Chace
*Assistant Examiner* — Prasith Thammavong
(74) *Attorney, Agent, or Firm* — Turocy & Watson, LLP

(57) ABSTRACT

Systems and/or methods that facilitate logical block address (LBA) to physical block address (PBA) translations associated with a memory component(s) are presented. The disclosed subject matter employs an optimized block address (BA) component that can facilitate caching the LBA to PBA translations within a memory controller component based in part on a predetermined optimization criteria to facilitate improving the access of data associated with the memory component. The predetermined optimization criteria can relate to a length of time since an LBA has been accessed, a number of times the LBA has been access, a data size of data related to an LBA, and/or other factors. The LBA to PBA translations can be utilized to facilitate accessing the LBA and/or associated data using the cached translation, instead of performing various functions to determine the translation.

12 Claims, 8 Drawing Sheets

ADDRESS CACHING STORED TRANSLATION

TECHNICAL FIELD

The subject innovation relates generally to memory systems and in particular to systems and methods that can facilitate providing translation for logical block address and physical block address in memory systems.

BACKGROUND

A wide variety of memory devices can be used to maintain and store data and instructions for various computers and similar systems. In particular, non-volatile memory (e.g., flash memory) is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EE-PROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. The physical structure is more robust against shock than volatile memory and has gained popularity in portable devices. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make memory devices, that utilize in part flash memory, a useful and popular means for transporting and maintaining data.

Typically, data can be stored in a physical memory location (e.g., physical block address (PBA)) in a memory device (which can be among a plurality of memory devices in a system). A logical block address (LBA) can be associated with the data and its corresponding PBA to facilitate retrieval of the data from the memory by a host. When the host requests data from or desires to write data to a particular LBA, the PBA in the appropriate memory device can be accessed through a translation process of the provided LBA. This translation process conventionally can be in the form of, for example, an address translation table or translation lookaside buffer (e.g., cache dedicated to address translations) that can be used to store translations of LBAs and PBAs. The table can be maintained in the host or in the individual memory device. However, the translation process (e.g., search process) of locating a page within a block can be time consuming, which can result in delaying a read of the memory, for the page locations are typically not stored within the table and a search of the pages within the memory can be performed to find the requested information.

In a system involving data storage in non-volatile memory systems, it can be desired to maintain LBA to PBA translation information. As data can be relocated physically in a memory device (or in the case of a multi-device system, between memory devices), a means to link the LBA and the appropriate corresponding PBA can be undertaken. Any such means can involve a unique combination of a specified number of translation attributes. Determination of these translation attributes can be achieved in part with the information associated with the LBA, which is in a known location of the non-volatile memory system(s). The attributes can include, for example, 1) which device has the data (in multi-device systems); 2) which erase block in the device has the data, 3) which page in the erase block has the data, and 4) which data block in the page has the data. Procedures to determine the attributes and obtain the LBA to PBA translation can be provided through a search process, a calculation process and/or a table look-up process, for example. It is desirable to improve the efficiency (e.g., speed) of performing LBA-PBA translations to reduce the amount of time to perform operations associated with the memory.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

This subject innovation presents systems and/or methods that can facilitate improved performance of logical block address (LBA) to physical block address (PBA) translations to facilitate improved access of a memory (e.g., flash memory). Typically, a memory controller component that can be associated with the memory can store part of an LBA to PBA translation in a table (e.g., device or erase block information); however, the memory controller component typically does not contain information as to which page and/or data block (e.g., memory location offset) the data is stored. As a result, when a memory controller component receives an LBA associated with a command (e.g., read, write etc.) from a host (e.g., personal data assistant (PDA), cellular phone, personal computer (PC), etc.), one or more functions (e.g., search, calculation, table lookup, etc.) for the page that contains the LBA can be performed to determine exactly where the LBA and/or associated data is located.

Conventionally, the search can take a relatively long time, especially if the page that contains the LBA and/or associated data is one of the last pages searched. For example, in one aspect of a memory associated with a memory controller, an erase block can be associated with 64 or 512 pages of data. Each page associated with an erase block can, for example, take approximately 50 microseconds (µs) (or longer) to search to determine if the page contains the exact PBA associated with the requested LBA. As a result, it can take over 3 milliseconds (ms) to search an erase block that contains 64 pages or over 25 ms to search an erase block that contains 512 pages of information, for example. The number of pages that can be associated with the erase blocks of a memory can make caching the entire LBA to PBA translations (e.g., memory device number, erase block number, page number, data block) impractical because of the size of cache that would be utilized to employ such caching. As a consequence, the pages are typically individually searched to find an entire LBA to PBA translation, and the amount of time that can be associated with the searching each page coupled with the number of pages within an erase block can result in relatively slow read performances.

The subject innovation can facilitate improved performance of determining the LBA to PBA translations, as compared to conventional memory devices/systems, in part by employing an optimized block address (BA) lookup component that can facilitate caching the LBA to PBA translations associated with a memory. The optimized BA lookup component can, for example, contain a block address (BA) cache component that can contain all the information desired to locate LBAs respectively associated with PBAs (e.g., identification and/or location of a memory component, erase block, page, and/or data block) for LBAs that meet predefined optimization criteria for caching of the LBA to PBA translation. The predefined optimization criteria can be based in part on the number of times that the LBA has been accessed and/or a length of time since the LBA was last accessed, for example. The memory controller component can use the LBA to PBA translation information stored in the BA cache component to efficiently determine the location of the data associated with the LBAs that meet the predetermined optimization criteria (e.g., without searching the memory). Upon reading the data that is located using the cached LBA to PBA translation information, the memory controller component can facilitate evaluating (e.g., checking) the data when it is retrieved to ensure the PBA contains the correct LBA and/or associated data. If the retrieved data does not correctly correspond to the LBA, the memory controller component can facilitate searching the memory for the correct LBA and/or associated data.

In accordance with one aspect of the disclosed subject matter, the optimized BA lookup component can also contain a BA counter component that can facilitate counting the number of times a particular LBA is presented to the memory controller component (e.g., for memory operations). The BA counter component can, for example, facilitate keeping track of the LBAs that a host (e.g., cellular phone, personal computer (PC), personal data assistant (PDA), global positioning system (GPS), media player, etc.) most often presents to a memory controller component to read data. In such an aspect, the size of the BA cache component can be reduced from containing all of the LBA to PBA translation information (e.g., that include page and data block information) for all of the memory pages associated with a particular memory to only storing the LBA to PBA translation information for a select number of LBAs (e.g., a number of LBA to PBA translations that a designer can determine to be optimal for a particular embodiment). For example, the BA counter component can track the number of times each LBA is presented to a memory controller component for read operations and can store all of the associated LBA to PBA translation information for a predetermined number (e.g., 10) of LBAs that are utilized most often (e.g., those LBAs that are read the most often) as compared to other LBAs. The memory controller component can directly find the LBA and/or associated data related to an LBA-PBA translation stored in the BA cache component, for example, without performing a search(es), table lookup(s), and/or calculation(s) to determine the translation attributes related to a desired LBA, since the LBA to PBA translation information can be retrieved from the BA cache component.

In another aspect, the BA counter component can also keep track of the LBAs for write operations. For example, a document can be read from memory (e.g., which can result in incrementing the BA counter component), edited, and written to the memory again. In certain types of flash memory (e.g., NAND flash memory) the document can be saved to a different physical address; however, the new physical address (e.g., PBA) and/or other LBA to PBA translation information can be updated and associated with the same LBA as the LBA that was used to read the document (e.g., if the LBA is to remain the same). In such an example, the memory controller component can facilitate incrementing the BA counter component for the write operation as well. By storing the LBA to PBA conversion (e.g., translation) information associated with only the most frequently used LBAs (e.g., for LBAs used in read and write operations), the disclosed subject matter can provide faster access (e.g., read) response times as compared to conventional techniques for performing LBA to PBA translations to access LBAs and/or associated data.

It is to be appreciated that that the BA counter component can contain a counter or incrementing circuitry to facilitate incrementing the number (e.g., stored in the BA counter component) of times an LBA is presented to the memory controller component for memory operations. As a result, the memory controller component can facilitate storing the LBA to PBA translation information (e.g., identification and/or location of the memory component, erase block, page, data block, etc.) for those LBAs that are most often accessed in the memory, for example.

In accordance with one aspect of the disclosed subject matter, the optimized BA lookup component can also be comprised of a BA timer component that can contain information regarding the last time a particular LBA was presented to a memory controller component to read data from the memory. The BA timer component can, for example, store such information as the date and/or time in which a particular memory location was read. In another example, the BA timer component can store information such as the amount of time that has passed since a particular LBA was presented to the memory controller component for a memory operation. In such an example, the time can be in units of milliseconds (ms), seconds, minutes, or days, for example. As a result, the memory controller component can utilize the time information associated with respective LBAs from the BA timer component to determine if a particular LBA and/or associated data is currently being utilized (e.g., to determine if the LBA-PBA translation information should be stored in the BA cache component). The determination regarding whether to store the LBA-PBA translation information in a cache to facilitate expedient retrieval of LBA-PBA translations can be based in part on an amount of time since an LBA was last accessed. For example, the predefined optimization criteria can specify that a number of LBAs (e.g., ten) that have been accessed at least one time in the last week which have been accessed the most number of times relative to other LBAs are to be cached in the BA cache component. The optimized BA lookup component can evaluate the respective counts for the number of times LBAs have been accessed and the respective times (e.g., time stamp) the LBAs have been accessed in order to identify and cache the number of LBAs (e.g., ten) that meet a predefined optimization criteria. As a result, the optimized BA lookup component can facilitate keeping the LBA-PBA translation information stored in the BA cache component that correspond to LBAs that are most often used and are the most recently used, for example.

In yet another aspect of the disclosed subject matter, the optimized BA lookup component can comprise a defrag component (e.g., defragmentation component) that can, where desirable, align LBAs in consecutive or substantially consecutive pages for data that can be dispersed across different pages within a memory (e.g., nonconsecutive pages). For example, a chunk of data (e.g., data that can comprise an entire document, picture, media file, etc.) can be spread across two or more nonconsecutive pages within an erase block (e.g., the fifth page, twentieth page, and the fiftieth page). The defrag component can, for example, facilitate aligning the chunk of data to be stored in consecutive or substantially consecutive page locations (e.g., the fifth page, sixth page, and seventh page). As a result of aligning the data in consecutive or substantially consecutive pages within an erase block, the time required to find and retrieve the data that can be associated with a starting LBA can be reduced and the size of BA cache component associated with the storage of the LBA to PBA translation information for data that is most recently read can be reduced. For example, the starting PBA page number associated with an LBA and a data block or number of pages value can be stored in the BA cache component. The memory controller component can facilitate retrieving the data associated with the entire data chunk without having to search multiple pages of data to find all of the data associated with a particular read operation, for example.

To the accomplishment of the foregoing and related ends, certain illustrative aspects are described herein in connection with the following description and the annexed drawings. These aspects are indicative of various ways that can be practiced, all of which are intended to be covered herein. Other advantages and novel features may become apparent from the following detailed description when considered in conjunction with the drawings.

DETAILED DESCRIPTION

Figure 1:
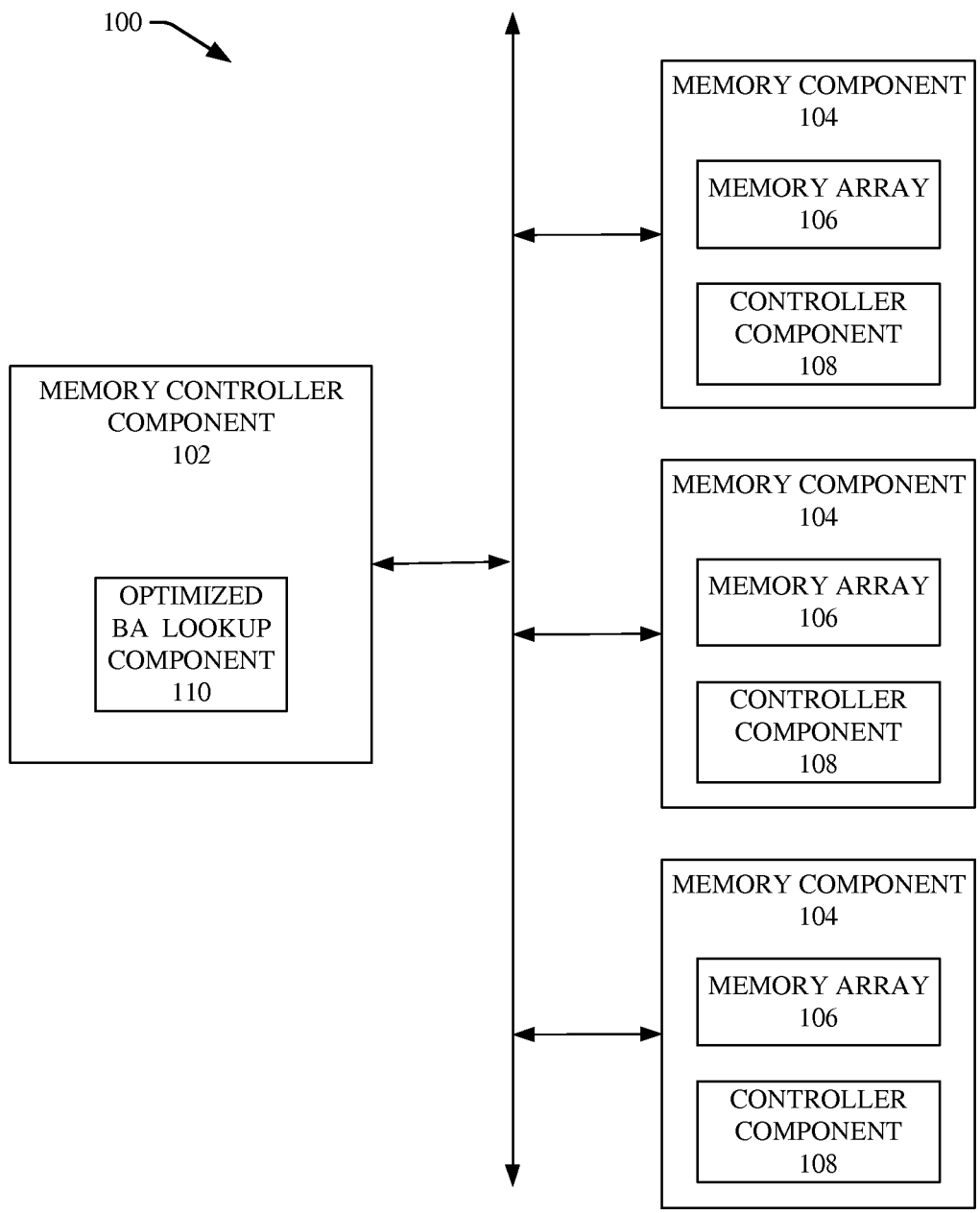
FIG. 1 illustrates a block diagram of a system that can facilitate LBA-PBA translations associated with a memory component(s) in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Systems and methods that can facilitate improved performance of logical block address (LBA) to physical block address (PBA) translations are presented. In an aspect, an optimized BA lookup component can be employed to facilitate storing (e.g., caching) LBA to PBA translations to facilitate efficient access (e.g., read of data) of data associated with a memory. In accordance with one aspect of the disclosed subject matter, the optimized BA lookup component can contain a BA cache component (shown in FIG. 2 and described herein) wherein LBA to PBA translation information can be stored. The BA cache component can contain such information as, for example, attribute information regarding the identification and/or location of the memory (e.g., for devices that contain more than one memory), the erase block, the page, and/or the data block that is associated with a particular LBA. The optimized BA lookup component can also contain a BA counter component (shown in FIG. 2 and described herein) that can, for example, store the number of times a particular LBA is used to access the memory. As a result, the BA counter component can facilitate storing the LBA to PBA translation information of the LBAs most often used to access the memory (e.g., for read/write operations), for example. By selecting to save only the LBA to PBA translation information associated with the LBAs that are utilized most often, the size of the BA cache component can be kept to a relatively small size (e.g., to a size that a designer deems adequate for a particular application) as compared to a cache component that stores the LBA to PBA translation information for all of the LBAs associated with a memory.

Figure 2:
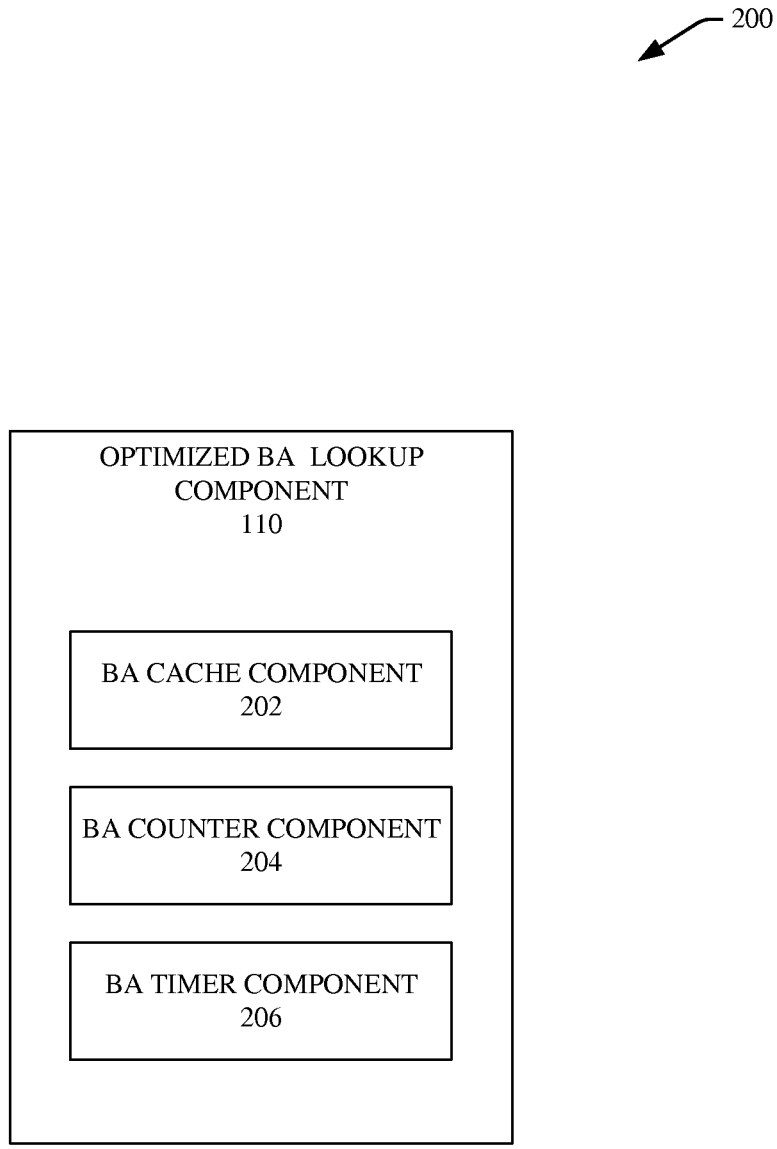
FIG. 2 depicts a block diagram of an optimized BA lookup component to facilitate LBA-PBA translations in accordance with an aspect of the disclosed subject matter.

In accordance with yet another aspect of the disclosed subject matter, the optimized BA lookup component can include a defrag component (as shown in FIG. 2 and described herein) that can facilitate defragmenting the memory. The defrag component can, for example, align chunks of related data (e.g., data that comprises an entire file) that are stored in nonconsecutive pages within a memory into consecutive or substantially consecutive pages. Aligning the related pages of data into consecutive or substantially consecutive pages, for example, can facilitate faster LBA to PBA translations while simultaneously saving the amount of storage (e.g., in a random access memory (RAM)) that the BA cache component contains to store the most and most recently used LBA-PBA translations.

Turning to the figures, FIG. 1 illustrates a system 100 that can facilitate translation management associated with a memory in accordance with an aspect of the disclosed subject matter. System 100 can comprise a memory controller component 102 that can facilitate the translation of an LBA to its corresponding PBA. In one aspect, memory controller component 102 can facilitate controlling the performance of various translation functions (e.g., search function, table look-up function, calculation function, etc.) that can be employed to facilitate management of the LBAs and PBAs as well as facilitate locating and/or accessing PBAs that can respectively contain LBAs and associated data based in part on LBAs.

The memory controller component 102 can be associated with one or more memory components 104 (e.g., three memory components 104 are depicted in FIG. 1) that can facilitate the storage of data, code, instructions, etc., wherein data can be written to, read from, and/or erased from the memory component(s) 104 based in part on commands, instructions, and/or requests to perform a write operation, read operation, and/or erase operation, respectively. Each memory component 104 can comprise nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM).

Each memory component 104 can include one or more memory arrays 106 (e.g., nonvolatile memory array) that can be composed of various memory schema (e.g., configurations of NOR flash and/or NAND flash) that can receive and store data. A memory array 106 can include a plurality of memory cells (not shown) wherein each memory cell can store one or more bits of data. Data stored in a memory cell(s) in the memory array 106 can also be read and such data can be provided as an output.

Each memory component 104 can also include a controller component 108. The controller component 108 can facilitate control of access to the memory component 104 and data stored therein, data management (e.g., handling internal memory organization) and extended interface commands (e.g., query commands). In one aspect, the controller component also can facilitate the execution of translation functions, such as a search function, a table look-up function, and/or a calculation function to facilitate management of LBAs and PBAs, translation of LBAs to PBAs, and/or locating and/or accessing PBAs based in part on LBAs.

Conventionally, the memory controller component 102 receives an LBA, and the memory controller component 102 has only a portion or no attribute information related to the LBA to PBA translation. The memory controller component 102 can perform various functions (e.g., table lookup, calculations, searches, etc.) to facilitate locating the desired LBA and/or associated data. For instance, the memory controller component 102, in coordination with a controller component 108, can search for the LBA, where each page associated with a memory component 104 can be retrieved and read to determine if the desired LBA is stored in such page. This iterative process can be time consuming, as for each of the page reads can, for example, take up to approximately 50 microseconds (μs) (or longer).

In accordance with one aspect, the memory controller component 102 can comprise, in part, an optimized block address (BA) lookup component 110 that can be associated with (e.g., communicatively connected with) the memory component(s) 104. The optimized BA lookup component 110 can be employed to facilitate storing a subset of LBA to PBA translations, based in part on a predefined optimization criteria, that can be utilized to facilitate locating LBAs and/or associated data in order to facilitate performing operations (e.g., read, write) thereon, for example. The optimized BA lookup component 110 can store LBA to PBA translation information (e.g., memory component information, erase block information, page information, data block information, etc.), or a subset thereof, associated with desired (e.g., selected) LBAs into a cache (not shown) (e.g., BA cache component 202 that is depicted in FIG. 2 and described herein), where the LBA to PBA translation information of an LBA can be selected to be cached based in part on a predefined optimization criteria. The predefined optimization criteria can relate to, for example, the frequency that an LBA is utilized (e.g., for accessing data), where the frequency can be determined based in part on the number of times the LBA is utilized (e.g., overall or over a given time period) and/or in relation to the frequency that other LBAs are utilized; can relate to the particular time(s) (e.g., most recent time that LBA is accessed) that the particular LBA has been utilized; and/or the size of the data block associated with the LBA; and/or other criteria.

For example, the memory controller component 102 can receive an LBA, and the optimized BA lookup component 110 can evaluate the number of times the particular LBA has been utilized (e.g., accessed), and if the number of times meets or exceeds the predefined optimization criteria, the optimized BA lookup component 110 can store the LBA to PBA translation information associated with that LBA. For instance, if the optimized BA lookup component 110 has a specified number of storage locations in which to store translations, a predefined optimization criteria can be to store up to a specified number (e.g., equal to the number of available storage locations) of LBA to PBA translations that have been utilized and/or requested the highest number of times, as compared to all LBAs associated with the memory component 104. The optimized BA lookup component 110 can, for example, track the number of times that each LBA is used and/or requested and can compare the respective number of times each LBA has been used/requested with the other LBAs to facilitate determining which LBAs have the highest number of times used/requested, and can facilitate storing the LBA to PBA translations related to the LBAs having the highest number of times used/requested (e.g., in cache component 202, as depicted in FIG. 2 and described herein).

When an LBA associated with a stored translation is to be accessed at a future time, the optimized BA lookup component 110 can facilitate retrieving the stored LBA to PBA translation associated therewith (e.g., from cache component 202, as depicted in FIG. 2 and described herein), and such translation can be utilized to access the physical location that contains the desired LBA and/or associated data, instead of having to perform the LBA to PBA translation by search, calculation, and/or table look-up processes. By directly obtaining the entire LBA to PBA translation information from the optimized BA lookup component 110, the memory controller component 102 can alleviate searching the pages within the erase bocks associated with the memory component 104 (e.g., that can otherwise be performed via traditional search/locate algorithms) that contains the desired LBA and/or associated data, thus enabling the memory controller component 102 to more efficiently present the LBA and/or data to the requesting entity.

In accordance with another aspect of the disclosed subject matter, the optimized BA lookup component 110 can employ a time criteria in determining which LBA to PBA translations to store. The time criteria can be employed by itself and/or in conjunction with other predefined optimization criteria, such as criteria that relates to the number of times each LBA is utilized and/or requested, in determining which LBA to PBA translations to store. For instance, the optimized BA lookup component 110 can be structured to evaluate LBAs based in part on a length of time since each LBA was last requested and/or accessed (e.g., utilized), and/or the number of times each LBA was utilized and/or requested over a particular period of time (e.g., hour, day, week, month, . . . ), and/or a predetermined number of recent LBA requests and/or accesses, etc. For example, the predetermined optimization criteria can be to store a specified number of LBA to PBA translations that have been utilized and/or requested the highest number of times in the last week. Also, if there is only one more storage location available in which to store a translation, and there are two translations having an equal number of times utilized/requested in the given time period, the translation that is utilized and/or requested most recently can be stored.

As another example, the optimized BA lookup component 110 can track and/or evaluate a predetermined number of recent LBA requests/accesses (e.g., 1000 LBA requests and/or accesses), and can select a specified number of LBA to PBA translations associated with LBAs that have higher numbers of requests and/or accesses (e.g., utilized for read or write) as compared to other LBAs over the predetermined number of recent LBA requests/accesses, and the specified number of translations can be stored in the specified number of storage locations (e.g., in cache component 202, as depicted in FIG. 2 and described herein).

It is to be appreciated that the disclosed subject matter contemplates that there are virtually any number of ways to track and determine the amount of time that has passed between LBA requests/accesses associated with a memory component(s) 104 (e.g., track actual time of each LBA request/access, time stamping LBA requests/accesses, track LBA requests/accesses using a monotonically incrementing clock, etc.), and the disclosed subject matter contemplates that all such ways are within the scope of the subject innovation, and the subject innovation is not limited to any specific way of determining the period between LBA requests/accesses.

In accordance with still another aspect of the disclosed subject matter, the predefined optimization criteria can be based in part on the size of the data that is associated with an LBA(s). For example, the optimized BA lookup component 110 can facilitate storing the LBA to PBA translation information of an LBA associated with a set of data (e.g., data file) stored in the one or more memory component(s) that is above a predefined size (and/or meets other predefined optimization criteria (e.g., number of times accessed/requested, time criteria, etc.)). The size criteria can be useful, for example, where there is a large data file that can be associated with more than one LBA and/or related data stored in various locations in the memory component(s) 104, and it is desirable to access the data file. The LBA to PBA translations of all LBAs (or at least a portion thereof) associated with the data file can be cached to facilitate quickly accessing the LBAs and associated data file.

It is to be appreciated that, while the memory controller component 102 is illustrated as a stand-alone component with respect to the memory components 104, the subject innovation is not so limited, as the subject innovation contemplates that, in accordance with various embodiments, at least a portion of the memory controller component can be integrated within a memory component(s) 104 and/or within another component, such as a processor component (not shown), for example, to facilitate an alternative implementation of parallel processing to facilitate determining memory component identification/location, erase block identification/location, page identification/location, and/or data block identification/location to facilitate performing a desired LBA to PBA translation across multiple memory components 104 and/or to facilitate accessing the desired LBAs.

It is to be further appreciated that, while three memory components 104 are depicted in FIG. 1, the subject innovation is not limited, as the subject innovation contemplates that there can be less than three memory components 104, three memory components 104, or more than three memory components 104 that can be employed in system 100, as desired.

Turning to FIG. 2, depicted is a system 200 that can facilitate storing LBA to PBA translations in accordance with an aspect of the disclosed subject matter. System 200 can comprise an optimized BA lookup component 110 wherein the optimized BA lookup component 110 can facilitate storing LBA to PBA translation information based in part on a predefined optimization criteria (e.g., as more fully described herein, for example, with regard to system 100). It is to be appreciated that that the optimized BA lookup component 110 can be the same or similar as, and/or can comprise the same or similar functionality as, respective components as more fully described herein, for example, with regard to system 100.

The optimized BA lookup component 110 can be in part comprised of a BA cache component 202, wherein the BA cache component 202 can store LBA to PBA translation information (e.g., the memory component attribute, erase block attribute, page attribute, data block attribute, etc. associated with a particular LBA) that can be related to LBAs used to access physical memory locations and/or associated data stored therein from one or more memory components (e.g., memory component(s) 104 as depicted in FIG. 1 and described herein). The BA cache component 202 can comprise volatile and/or non-volatile memory, such as the types of volatile and/or non-volatile memory described herein with regard to system 100. In another aspect, the BA cache component 202 can comprise registers and/or latches that can store LBA to PBA translation information that can be associated with an LBA(s) and/or a memory operation (e.g., read operation, write operation, etc.). It is to be appreciated that the type of storage (e.g., RAM, SDRAM, registers) utilized to cache the LBA to LBA translation information within the BA cache component 202 can depend in part on a particular embodiment of the disclosed subject matter (e.g., the number of LBA to PBA translation information that is desired to be stored for a particular embodiment). The BA cache component 202 can contain a predetermined number of storage locations, as desired, in which to store the LBA to PBA translations and/or associated information.

In accordance with another aspect, the optimized BA lookup component 110 can comprise a BA counter component 204 that can track and maintain the number of times each LBA and/or associated data has been accessed. In accordance with an embodiment, the count information respectively associated with LBAs can be contained in a list or table, which can be accessed to retrieve the desired time information. The counts respectively associated with LBAs of respective memory components 104 can be utilized to facilitate determining whether to store an LBA to PBA translation of a particular LBA(s) based in part on a predefined optimization criteria. In accordance with an aspect, the optimized BA lookup component 110 and/or BA counter component 204 can facilitate resetting and/or adjusting a count associated with an LBA based in part on predefined optimization criteria. For instance, a predefined optimization criteria can include resetting (e.g., resetting count to 0) (or adjusting (e.g., decrementing)) a count associated with an LBA if the LBA has not been accessed for a predetermined period of time; and/or can include resetting and/or adjusting a count associated with an LBA if data associated therewith is modified and/or the physical location (e.g., PBA associated with the LBA) is changed. In accordance with another aspect, the BA counter component 204 can comprise and/or can access storage locations wherein the count information respectively associated with LBAs can be stored. The storage locations can comprise volatile and/or non-volatile memory, such as the types of volatile and/or non-volatile memory described herein with regard to system 100.

In accordance with an aspect, the optimized BA lookup component 110 can also include a BA timer component 206, wherein the BA timer component 206 can track, maintain, and/or store time information respectively associated with LBAs and/or LBA to PBA translations. The BA timer component 206 can track the amount of time that has passed since a particular LBA and/or associated data has been accessed from one or more of the memory component(s). For example, when a particular LBA is requested and/or accessed to facilitate reading or writing data to a memory component, the time the particular LBA was accessed can be tracked and such time information can be associated with that LBA and stored in the BA timer component 206.

In accordance with various embodiments, the BA timer component 206 can track and maintain the time information related to respective accessing of LBAs by using a monotonically increasing timer, time stamps, and/or a clock-type mechanism that can be based in part on a system clock, etc. For example, the timing information can be tracked via the number of clock cycles that has passed since the last time particular data has been accessed, wherein the clock cycles can be generated using virtually any clock frequency to facilitate a desired amount of time. As another example, when an LBA is accessed and/or requested, the time can be recorded as a time stamp, where the time can be based in part on a clock cycle count or a count (e.g., monotonically increasing clock), and the time stamp can be stored. In accordance with an embodiment, the time information respectively associated with LBAs can be contained in a list or table, which can be accessed to retrieve the desired time information. In accordance with still another embodiment, the BA timer component 206 can track a predetermined number of the most recent LBA requests and/or accesses, where, for example, information related to each new LBA request and/or access can be queued and/or stored in a first-in-first-out buffer (e.g., FIFO) and information related to the oldest request and/or access stored in the FIFO can be removed from the FIFO, as time information respectively associated with LBA requests and/or accesses can be ordered in the FIFO according to the order in which the LBA requests/accesses were received. The FIFO can facilitate maintaining information related to LBAs that have been requested and/or accessed most recently in time.

In accordance with another aspect, the time information respectively associated with LBAs can be tracked, maintained, modified, reset, and/or utilized based in part on the predefined optimization criteria. For example, the predefined optimization criteria can specify that if a particular LBA has not been accessed for a predetermined period of time, the time information can be adjusted or reset (e.g., erased); and/or can include resetting and/or adjusting the time information associated with an LBA if data associated therewith is modified and/or the physical location (e.g., PBA associated with the LBA) is changed.

In accordance with another aspect, the BA timer component 206 can comprise and/or can access storage locations wherein the time information respectively associated with LBAs can be stored. The storage locations can comprise volatile and/or non-volatile memory, such as the types of volatile and/or non-volatile memory described herein with regard to system 100.

It is to be appreciated that the disclosed subject matter contemplates that there are virtually any number of ways to track and determine the amount of time that has passed between LBA requests/accesses associated with a memory component(s) 104 (e.g., track actual time of each LBA request/access, time stamping LBA requests/accesses, track LBA requests/accesses using a monotonically incrementing clock, etc.), and the disclosed subject matter contemplates that all such ways are within the scope of the subject innovation, and the subject innovation is not limited to any specific way of determining the period between LBA requests/accesses.

In accordance with an aspect, the optimized BA lookup component 110 can utilize and/or evaluate the count information stored within the BA counter component 204, the time information stored within the BA timer component 206 and/or other information (e.g., data size of chunk of data associated with an LBA(s)) to facilitate determining whether an LBA to PBA translation and/or associated information is to be stored within the BA cache component 202 and/or whether a cached LBA to PBA translation is to be removed from the BA cache component 202, based in part on the predefined optimization criteria.

In accordance with another aspect, the optimized BA lookup component 110 can facilitate updating and/or modifying LBA to PBA translations when an LBA and/or associated data has been updated, modified, and/or moved to a different physical location (e.g., PBA) in a memory component 104. For instance, if an LBA to PBA translation(s) is cached, it can be updated and re-cached with the updated translation when a portion (e.g., at least one translation attribute) of the LBA to PBA translation has changed and the associated LBA meets the predefined optimization criteria. For instance, an LBA and/or associated data can be accessed based in part on an associated cached LBA to PBA translation. If data associated with the LBA has been modified and/or moved to another physical location (e.g., PBA) in the memory component, the optimized BA lookup component 110 can track and facilitate updating the translation attribute information to reflect the new translation information (e.g., the new physical location) and the new LBA to PBA translation can be cached in the BA cache component 202 if the LBA meets the predefined optimization criteria.

It is to be appreciated that that the disclosed subject matter contemplates that, in one embodiment, the BA cache component 202, BA counter component 204, BA timer component 206 or combination thereof can be contained within the same physical storage component (e.g., RAM, SDRAM, registers, etc.), or, in accordance with various other embodiments, the individual components (e.g., the BA cache component 202, BA counter component 204, BA timer component 206, or a suitable combination thereof) can be comprised of separate storage components. For example, if one storage component is utilized to store count information, time information, and/or other information related to LBA to PBA translations, each of the address location(s) associated with the storage component (e.g., RAM, SDRAM, registers, etc.) can have a specified number of bits (e.g., six bits) set aside for the information that can be contained within the BA counter component 204, another specified number of bits set aside (e.g., ten bits) for the information that can be contained within the BA timer component 206, and still another specified number of bits set aside (e.g., forty-eight bits) to contain the information that can be contained in the BA cache component 202 (e.g., LBA to PBA translation information for particular LBAs).

Figure 3:
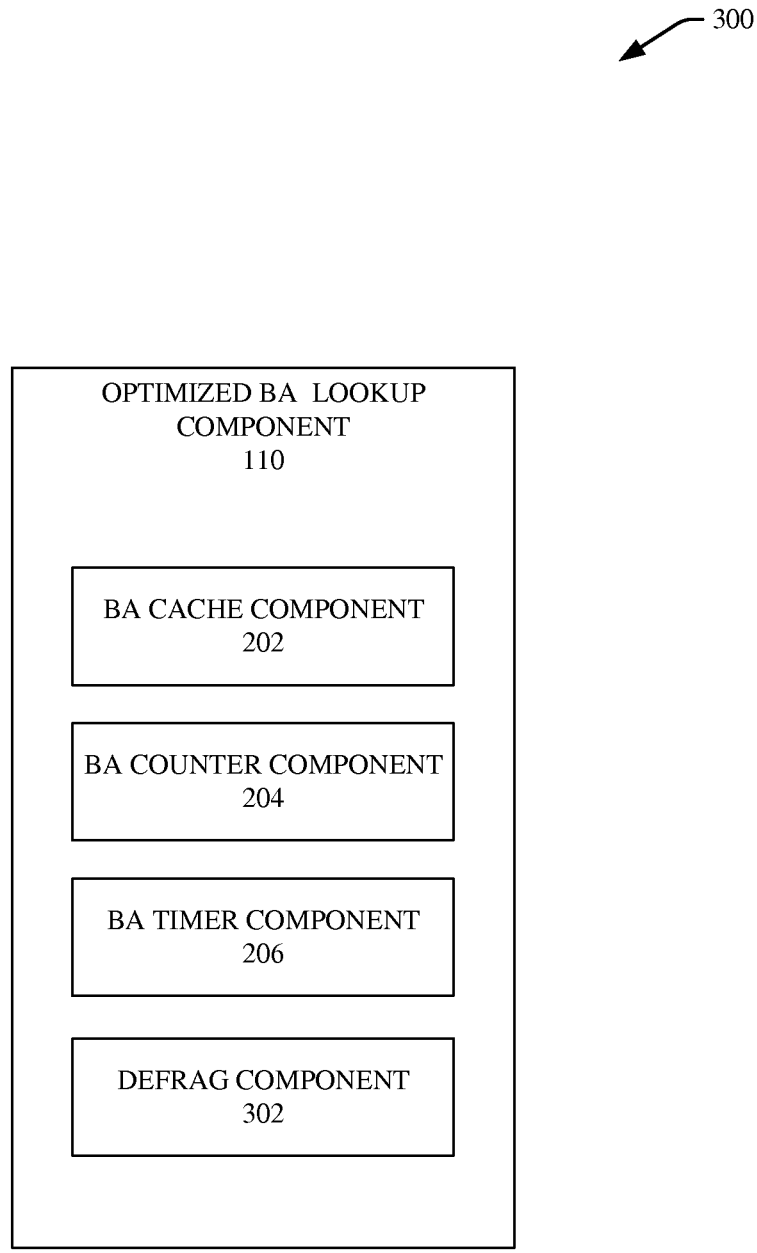
FIG. 3 is a block diagram depicting a system that can employ a defrag component to facilitate LBA-PBA translations in accordance with an aspect of the subject matter disclosed herein.

FIG. 3 depicts a system 300 that can employ a defrag component to facilitate LBA to PBA translation management in accordance with an aspect of the disclosed subject matter. System 300 can be comprised of an optimized BA lookup component 110, wherein the optimized BA lookup component 110 can be used to facilitate efficiently locating data associated with one or more LBAs, for instance, by caching LBA to PBA translations respectively associated with LBAs based in part on the predefined optimization criteria. The optimized BA lookup component 110 can be comprised in part of a BA cache component 202 that can store LBA to PBA translation information associated with particular LBAs. The optimized BA lookup component 110 can also be comprised of a BA counter component 204 that can track and maintain a count of the number of times LBAs are accessed and/or requested in association with one or more memory component(s) (e.g., memory component 104 as depicted in system 100). The optimized BA lookup component 110 can also be comprised of a BA timer component 206 that can store information that can relate to the amount of time that has passed since a particular LBA was accessed and/or requested and/or can store and maintain information (e.g., time stamps) regarding a desired number of LBA accesses and/or requests, for example. It is to be appreciated that that the optimized BA lookup component 110 and the associated components (e.g., BA cache component 202, BA counter component 204, and the BA timer component 206) each can be the same or similar as, and/or can comprise the same or similar functionality as, respective components as more fully described herein, for example, with regard to system 100 and/or system 200.

In accordance with one aspect of the disclosed subject matter, the optimized BA lookup component 110 can also comprise in part a defrag component 302. The defrag component 302 can, for example, align pages of data within the memory component(s) that can be associated with each other to be stored in consecutive pages or substantially consecutive pages. For example, the defrag component 302 can facilitate monitoring which pages in which data (e.g., data associated with a file that is larger than one page of data) can be stored. In one aspect, data pertaining to a particular file (e.g., a document file, photograph file, audio file etc.) can be contained in three non-consecutive pages (e.g., pages five, eight, and twenty-seven). In accordance with one aspect of the disclosed subject matter, as desired, the defrag component 302 can move the three pages of data to three consecutive pages (e.g., pages five, six, and seven) located within an erase block (not shown) that can be associated with one or more memory component(s), for example.

By moving related data to consecutive pages or substantially consecutive pages, the defrag component 302 can facilitate efficiently determining where data associated with a particular LBA is located. For example, the defrag component 302 and/or the BA cache component 202 can store information relating to where the data is located with regard to a particular LBA. In addition, the defrag component 302 and/or the BA cache component 202 can store, for example, the number of pages in which the data is stored. In accordance with one aspect of the disclosed subject matter, an entire file (e.g., document file, photograph file, media file, etc.) can be efficiently obtained my reading the LBA to PBA translation information along with the number of pages associated with the data from the BA cache component 202 associated with a particular LBA, for example.

It is to be appreciated that that the defrag component 302 can, for example, systematically evaluate data associated with the pages that can be contained in the memory component(s) (e.g., memory component 104 as described herein with reference to system 100) to determine which data files are fragmented (e.g., contained in non-consecutive pages). The systematic evaluation of data can, for example, be facilitated during times in which data operations associated with the memory component(s) are not actively being executed. It is to be further appreciated that the defrag component 302 can work in conjunction with wear-leveling programs (not shown) that can be represented either in hardware or software to determine which page locations the data can be moved (if the data is to be moved at all), for example.

Figure 4:
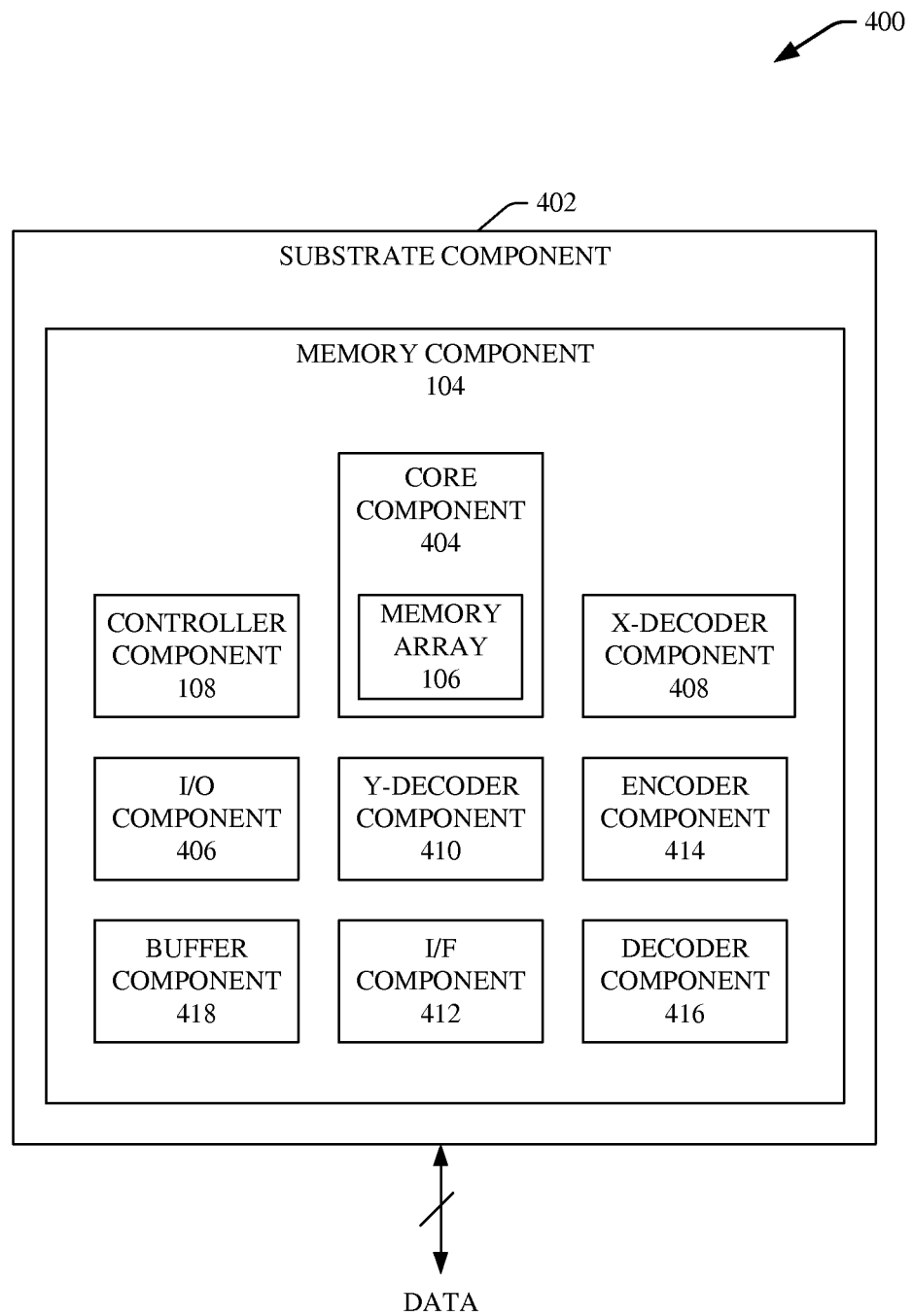
FIG. 4 depicts a block diagram of a memory device in accordance with an embodiment of the disclosed subject matter.

Turning now to FIG. 4, depicted is a block diagram of a memory device 400 that can facilitate storage of data and/or LBA to PBA translations in accordance with an aspect of the disclosed subject matter. Memory device 400 can include a memory component 104 that can comprise a non-volatile memory (e.g., flash memory) and/or volatile memory (e.g., SRAM). The memory component 104 can receive information, including data, commands, and/or other information, which the memory component 104 can process (e.g., store data, execute commands, etc.). The memory component 104 can include a memory array(s) 106 that can contain a plurality of memory cells (not shown), where each memory cell can store one or more bits of data. The memory component 104 can further include a controller component 108 that can execute instructions, commands, etc., to facilitate controlling the flow of data to/from the memory component 104. The memory component 102, memory array(s) 106, and controller component 108 each can be the same or similar as, and/or each can contain the same or similar functionality as the respective components more fully described herein, for example, with regard to system 100, system 200, and/or system 300.

In one aspect, the memory component 104, including the memory array(s) 106, controller component 108, and other components described herein, for example, with regard to memory device 400 can be formed and/or contained on a substrate 402 (e.g., semiconductor substrate). In another aspect, one or more core components 404 (e.g., high-density core regions) and one or more lower-density peripheral regions can be formed on the substrate 402. The core component(s) 404 typically can include one or more M by N arrays (e.g., memory array 106) of individually addressable, substantially identical multi-bit memory cells (not shown). The lower-density peripheral regions can typically include an input/output component 406 (e.g., input/output (I/O) circuitry) and programming circuitry for selectively addressing the individual memory cells. The programming circuitry can be represented in part by and can include one or more x-decoder components 408 and one or more y-decoder components 410 that can cooperate with the I/O component 406 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 408 and a y-decoder component 410 can each receive address bus information, which can be provided as part of a command, and such information can be utilized to facilitate determining the desired memory cell(s) in the memory component 104.

The memory component 104 can receive information (e.g., data, commands, etc.) via an interface component 412 (also referred to herein as "I/F 412"), which can also be formed on substrate 402. I/F 412 can include and/or provide various adapters, connectors, channels, communication paths, etc. to integrate the memory component 104 into virtually any operating and/or database system(s) and/or with one another system(s). In addition, I/F 412 can provide various adapters, connectors, channels, communication paths, etc., that can provide for interaction and/or communication with a processor component (not shown), and/or any other component, data, and the like, associated with the memory device 400.

The memory component 104 can also contain an encoder component 414 that can facilitate encoding data being programmed to the memory component 104, where the encoder component 414 also can be formed on the substrate 402. For example, the encoder component 414 can facilitate converting a digital signal to an analog signal (e.g., current level) to facilitate programming data in the memory locations (e.g., memory cells) in the memory component 104.

The memory component 104 can further include a decoder component 416 that can facilitate decoding data being read from the memory component 104. The decoder component 416 can receive an analog signal associated with data, where the analog signal can be stored in the memory location in the memory array 106, and can facilitate converting the analog signal to a digital signal, so that such digital signal representing the read data can be provided to another component (e.g., processor component) for further processing.

In still another aspect, a buffer component 418 can be formed on the substrate 402. The buffer component 418 can comprise volatile (e.g., SRAM) and/or nonvolatile memory to facilitate storage of data, for example, to temporarily store data being written to and/or read from the memory array 106, and/or other data associated with the memory component 104 (e.g., LBA to PBA translation information).

Figure 5:
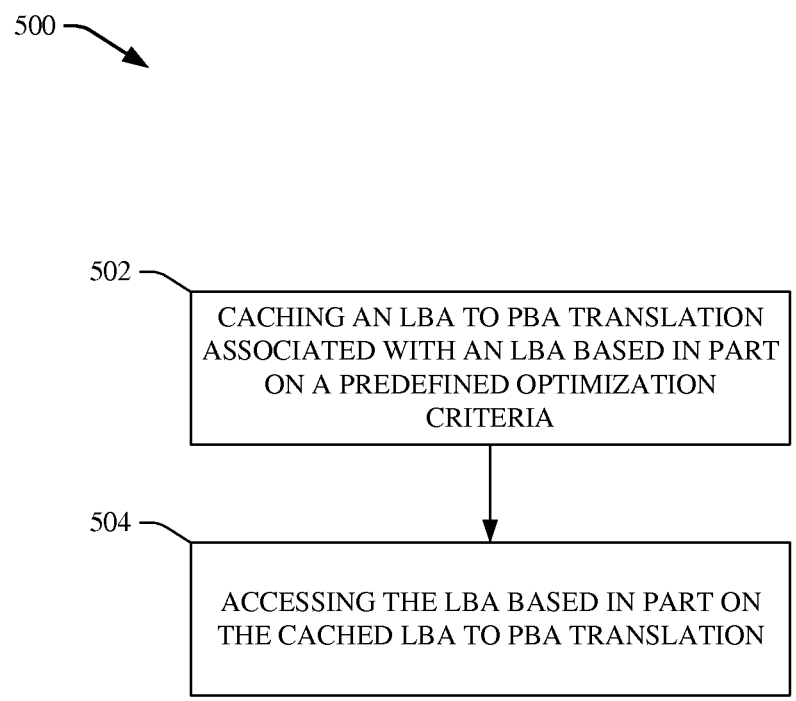
FIG. 5 depicts a methodology that can facilitate determining if an LBA-PBA translation can be cached in accordance with an aspect of the disclosed subject matter.
Figure 6:
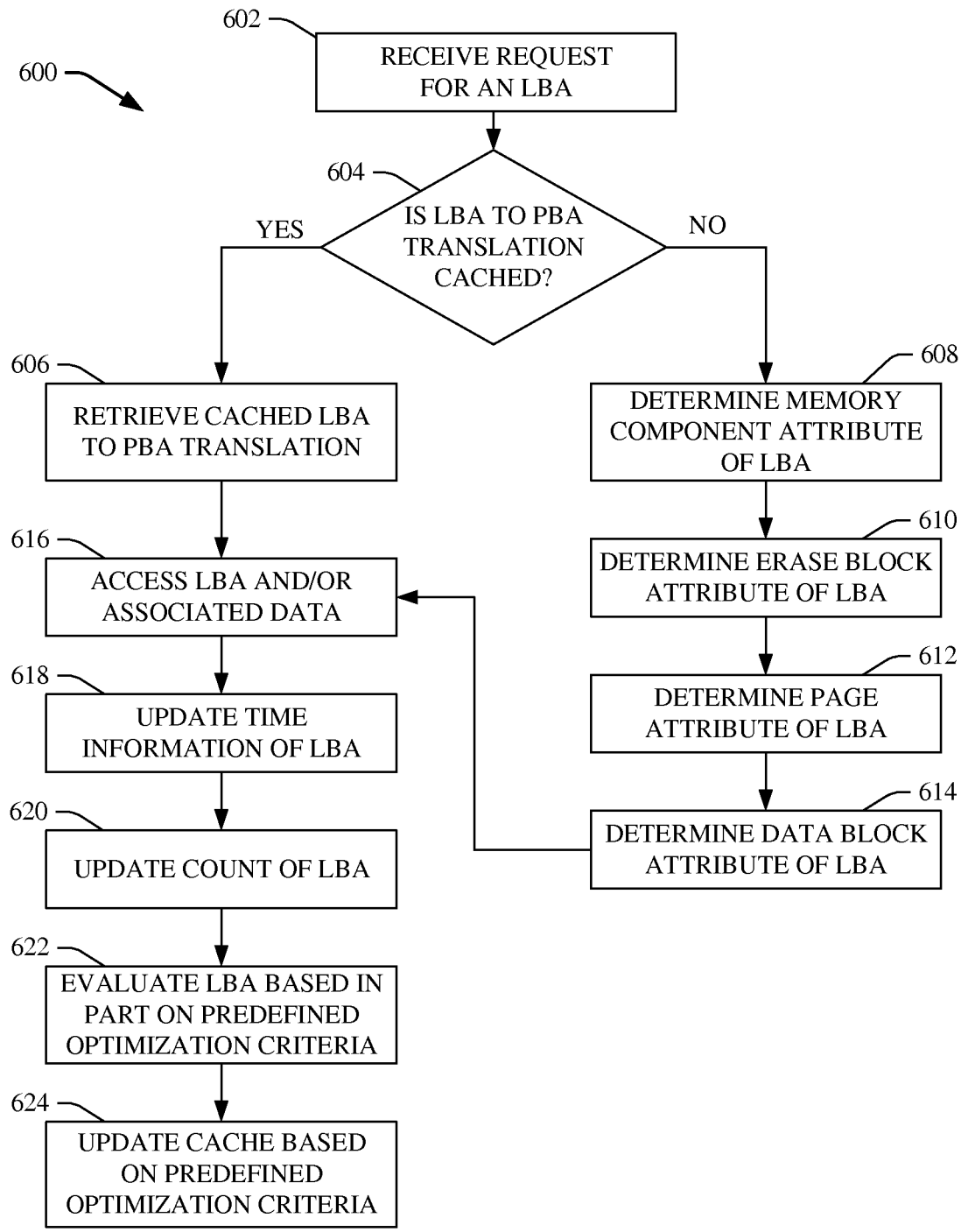
FIG. 6 illustrates a methodology that can facilitate updating an LBA-PBA translation cache in accordance with an aspect of the disclosed subject matter.
Figure 7:
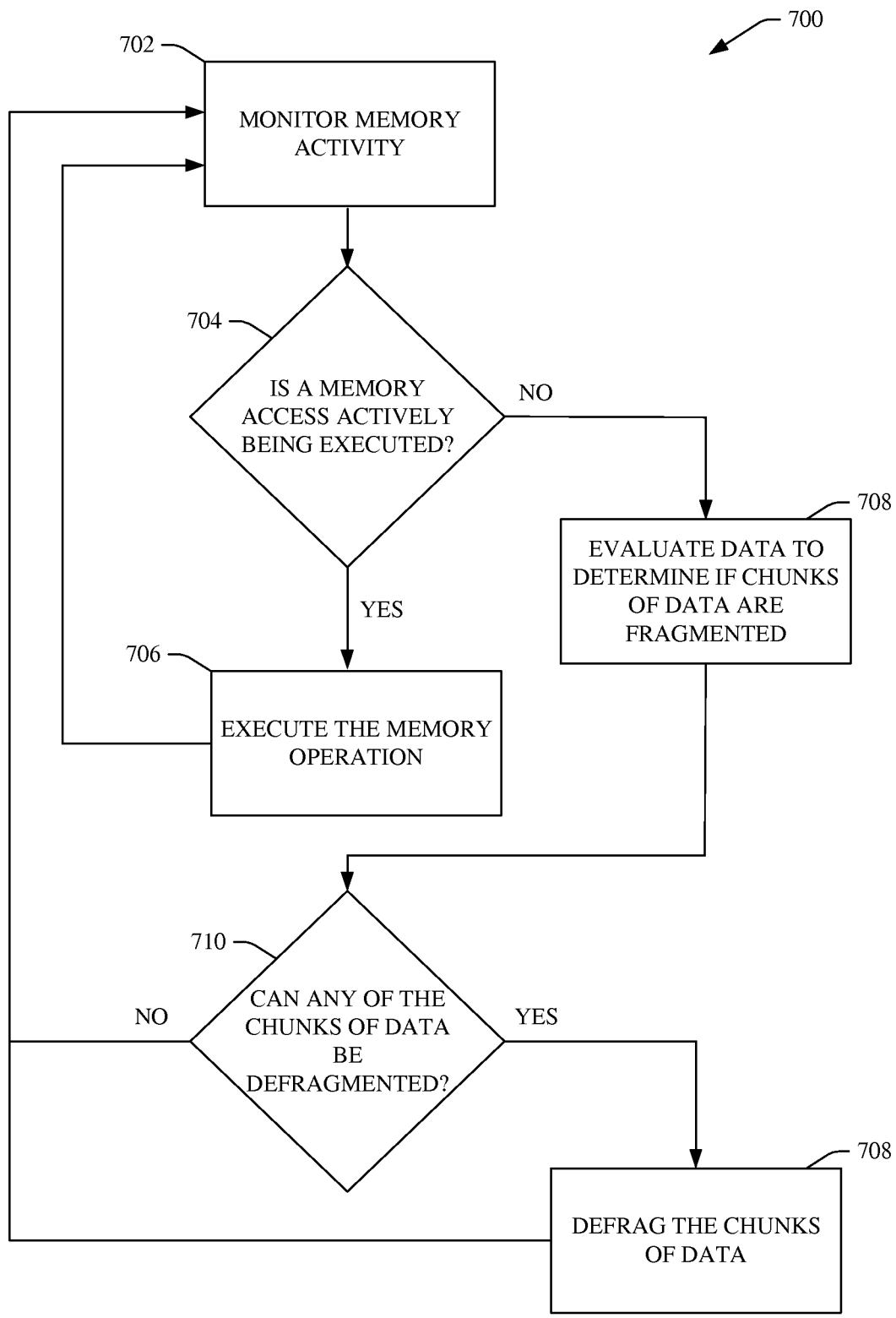
FIG. 7 illustrates a methodology that can facilitate defragmenting a chunk of data associated with a PBA in accordance with an aspect of the disclosed subject matter.

FIGS. 5-7 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be desired to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 5, a methodology 500 that can facilitate LBA to PBA translations associated with a memory(ies) in accordance with an aspect of the disclosed subject matter is illustrated. At 502, an LBA to PBA translation associated with an LBA can be cached based in part on predefined optimization criteria (e.g., such as described more fully herein). In one aspect, a memory controller component (e.g., 102) can include an optimized BA lookup component (e.g., 110) that can facilitate caching a predetermined number of LBA to PBA translations respectively associated with particular LBAs in a BA cache component (e.g., 202), based in part on the predefined optimization criteria (e.g., such as more fully described herein). The LBA to PBA translation information can comprise LBA attribute information, such as the memory component, such as the particular memory component (e.g., 104), erase block, page, data block (e.g., offset), etc. associated with the particular LBA. The cached LBA to PBA translation of an LBA can be utilized to identify, locate, and/or access the LBA when desired (e.g., during a read operation or write operation).

At 504, the LBA and/or associated data can be accessed based in part on the stored LBA to PBA translation. In one aspect, a command can be generated to locate and/or access the LBA, where the desired LBA can be stored in and/or associated with data stored in one or more memory component(s) (e.g., memory component 104 of FIG. 1). The memory controller component (e.g., memory controller component 102 of FIG. 1 and described herein) (and optimized BA lookup component associated therewith) can receive the command information, and can evaluate the LBA to determine whether the LBA to PBA translation for such LBA is stored in the BA cache component (e.g., 202). If the LBA to PBA translation is stored in the BA cache component, the LBA to PBA translation can be retrieved from the BA cache component and utilized to facilitate identifying, locating, and/or accessing the desired LBA. As a result, there can be a significant time savings over conventional LBA to PBA translation techniques, which can involve performing searches, calculations, and/or table lookups of individual LBA attributes in order to determine the LBA to PBA translation of a particular LBA.

In accordance with an aspect, an LBA to PBA translation(s) that is cached can be updated when at least a portion (e.g., at least one translation attribute) of the LBA to PBA translation has changed and re-cached with the updated translation if the associated LBA meets the predefined optimization criteria. For instance, an LBA and/or associated data can be accessed based in part on an associated cached LBA to PBA translation. If data associated with the LBA has been modified and/or moved to another physical location (e.g., PBA) in the memory component, translation attribute information associated with the new physical location can be tracked by the optimized BA lookup component 110 and the new LBA to PBA translation can be cached in the BA cache component 202 if the LBA meets the predefined optimization criteria.

In another aspect, if the LBA to PBA translation information is not stored in the BA cache component, the memory controller component can facilitate searching for the LBA using conventional LBA search techniques (e.g., search algorithms, calculations, lookup tables, etc.). It is to be appreciated that once the memory controller component finds the PBA associated with the current LBA, the optimized BA lookup component can evaluate the LBA based in part on the predefined optimization criteria to determine whether to store the LBA to PBA translation information associated with the current LBA in the BA cache component, and such translation can be stored in the BA cache component if the current LBA meets the predefined optimization criteria. At this point, methodology 500 can end.

Referring to FIG. 6, a methodology 600 that can facilitate determining whether an LBA to PBA translation information is contained in a cache in accordance with an aspect of the disclosed subject matter is illustrated. At 602, a request for an LBA and/or associated data can be received. In accordance with one aspect of the disclosed subject matter, a memory controller component (e.g., memory controller component 102 of FIG. 1 and described herein) can receive a request for an LBA and/or associated data, which can stored in one or more memory component(s) (e.g., memory component(s) 104 of FIG. 1 and described herein). At 604, a determination can be made as to whether LBA to PBA translation information that corresponds to the LBA is cached. In accordance with one aspect of the disclosed subject matter, a BA cache component (e.g., BA cache component 202 of FIG. 2 and described herein) can store the LBA to PBA translation information associated with the LBA based in part on a predefined optimization criteria (e.g., as described herein with regard to system 100, system 200, methodology 500, etc.). If it is determined that the LBA to PBA translation information is cached, at 606, the LBA to PBA translation for the LBA can be retrieved. In one aspect, the translation associated with the LBA can be retrieved from the BA cache component. At this point, methodology 600 can proceed to reference numeral 616.

If, however, at 604, it is determined that the LBA to PBA translation for the LBA is not cached, at 608, the memory component attribute for the desired LBA and/or associated data can be determined. In one aspect, the memory controller component and/or another component (e.g., processor, memory component) can perform a search, calculation, and/or table lookup in order to determine in which memory component the desired LBA and/or desired data is stored. At 610, the erase block attribute associated with the LBA and/or associated data can be determined. In one aspect, the memory controller component and/or another component (e.g., processor, memory component) can perform a search, calculation, and/or table lookup in order to determine in which erase block within a memory component the desired LBA and/or desired data is stored. At 612, the page attribute associated with the LBA and/or associated data can be determined. In one aspect, the memory controller component and/or another component (e.g., processor, memory component) can perform a search, calculation, and/or table lookup in order to determine the page within an erase block the desired LBA and/or desired data is stored. At 614, the data block attribute associated with the LBA and/or associated data can be determined. In one aspect, the memory controller component and/or another component (e.g., processor, memory component) can perform a search, calculation, and/or table lookup to determine the data block within a page that the desired LBA and/or desired data is stored.

At 616, the LBA and/or associated can be accessed. In one aspect, the LBA and/or associated data can be accessed (e.g., the physical location associated with the LBA can be accessed) based in part on the LBA to PBA translation for the LBA. The data associated with the LBA can be read from, written to, and/or erased from the physical location (e.g., PBA) associated with the LBA.

At 618, time information associated with the LBA can be updated. For example, a BA timer component (e.g., BA timer component 206 of FIG. 2 and described herein) can calculate and/or update the time at which the LBA is being accessed. The time information can be used, for example, to facilitate determining whether the LBA to PBA translation for such LBA is to be stored in the BA cache component based in part on the predefined optimization criteria.

At 620, a count associated with the LBA can be updated. In one aspect, the optimized BA lookup component can include a BA counter component (e.g., BA counter component 204 of FIG. 2 and described herein) that can maintain respective counts respectively associated with LBAs, and can update (e.g., increment) the count associated with the LBA. In accordance with an aspect, the count information associated with the LBA can be utilized to facilitate determining whether the LBA to PBA translation for such LBA is to be stored in the BA cache component based in part on the predefined optimization criteria.

At 622, the LBA can be evaluated based in part on the predefined optimization criteria. In one aspect, the optimized BA lookup component can evaluate the LBA and associated information (e.g., time information, count information, size information) relevant to translation caching determinations to determine whether the LBA to PBA translation for the LBA is to be cached. The optimized BA lookup component can compare the LBA and associated information to respective pieces of information associated with other LBAs to facilitate evaluating the LBA and determining whether to cache the LBA to PBA translation associated therewith. At 624, the cache can be updated based in part on the predefined optimization criteria. In one aspect, the optimized BA lookup component can determine whether the LBA to PBA translation for the LBA is to be cached based in part on the evaluation of the LBA and its associated information, respective information of other LBAs, and the predefined optimization criteria. If it is determined that the LBA meets the predefined optimization criteria, the cache (e.g., BA cache component) can be updated and the LBA to PBA translation can be stored in the BA cache component. If it is determined that the LBA does not meet the predefined optimization criteria, the cache is not updated to store the LBA to PBA translation for the LBA, although the cache can be updated based in part on other factors. At this point, methodology 600 can end.

Referring to FIG. 7, a methodology 700 that can facilitate defragmenting a chunk of data (e.g., data that can comprise a document, picture, media file, etc., or a respective portion thereof) associated with a memory in accordance with an aspect of the disclosed subject matter is illustrated. At 702, memory activity can be monitored. For example, a memory controller component (e.g., memory controller component 102 of FIG. 1 and described herein) and/or an optimized BA lookup component (e.g., optimized BA lookup component 110 of FIG. 1, and described herein) associated therewith can monitor memory operations that can be associated with one or more memory component(s) (e.g., one or more memory component(s) 104 of FIG. 1 and described herein).

At 704, it can be determined if there is currently a memory operation being executed. In accordance with one aspect of the disclosed subject matter, the memory controller component can facilitate notifying the optimized BA lookup component as to whether or not there are currently any memory operations being executed (e.g., via a host, such as a cellular phone, thumb drive, laptop, etc.). If it is determined that there are memory operations being executed, at 706, the memory operation(s) can continue to be executed. In accordance with one aspect of the disclosed subject matter, the memory controller component can have been tasked to facilitate executing a write, read, and/or erase, operation, for example. In accordance with one aspect of the disclosed subject matter, the memory controller component can wait until the current memory operation(s) is finished, wherein the flow can return back to reference numeral 702, and the memory controller component can again monitor for memory activity. In accordance with one embodiment of the disclosed subject matter, the flow can immediately return to reference numeral 702 wherein the memory controller component and/or optimized BA lookup component can monitor for memory activity while the memory controller component simultaneously or substantially simultaneously can execute the memory operation.

Returning back to reference numeral 704, if it is determined that there are not is no memory operation currently being executed, at 708, data (e.g., data stored in memory locations within the one or more memory component(s)) can be evaluated to determine if chunks of data (e.g., data that can be contained in more than one page associated with the one or more memory component(s)) are fragmented. For example, a defrag component (e.g., defrag component 302 of FIG. 3) can facilitate reading and/or evaluating all or a specified number of pages (e.g., 16 pages) associated with one or more of the memory component(s) to facilitate determining whether any chunks of data are fragmented, for example.

At 710, it can be determined whether any chunks of data (e.g., constituting a data file, or portion thereof) can be defragmented. For example, the defrag component can determine whether related pieces of data (e.g., chunks of data) are spread across two or more nonconsecutive pages and, if so, whether the related pieces of data can be aligned into consecutive pages or substantially consecutive pages in a memory component. In accordance with one aspect, the defrag component can work in conjunction with a wear leveling component(s), for example, to determine the optimal consecutive pages or substantially consecutive pages that the chunks of data can be stored. For example, a chunk of data can be spread across two or more pages. In such an example, the chunk of data can have a storage location associated with nonconsecutive pages (e.g., the fifth page, twentieth page, and the fiftieth page) within a particular erase block. The defrag component can, for example, facilitate aligning the chunk of data to be stored in consecutive page locations (e.g., the fifth page, sixth page, and seventh page). As a result of aligning the data in consecutive pages within an erase block, the time required to find and retrieve the chunk of data associated with an LBA can be reduced and/or the amount of data used for an LBA to PBA translation for the chuck of data can be reduced. For instance, if the chunk of data is stored in consecutive pages within an erase block, the starting page number associated with a PBA corresponding to an LBA and a data block or number pages value can be stored in the BA cache component. The memory controller component can facilitate retrieving the data associated with the entire data chunk without requiring separate PBA page information for each portion of the chunk of data. Even if a chunk of data is only organized into substantially consecutive pages within an erase block (instead of consecutive pages), there can be still be a benefit, as there can still potentially be a reduction in the amount of data used for the LBA to PBA translation and/or a reduction in time to retrieve the chunk of data, as compared to conventional data storage and retrieval techniques.

If, at 710, it is determined that there are no chunks of data to be defragmented, methodology 700 can return to reference numeral 702, and the memory activity can be monitored. However, if, at 710, it is determined that one or more of the chunks of data can be defragmented, at 712, the chunk(s) of data can be defragmented. In one aspect, the defrag component can facilitate organizing the chunks of data to be stored in consecutive pages or substantially consecutive pages, such as described herein with regard to reference numeral 710. After the defragmentation of the chunks of data is complete, methodology 700 can return to reference numeral 702.

It is to be appreciated that that defragment of the chunks of data can be executed before, after, or during a memory operation is requested. In accordance with one aspect of the disclosed subject matter, a memory operation can be requested during the process of defragmenting one or more of the chunks of data. In such an occurrence, the memory controller component can, for example, simultaneously service the memory operation while performing the defragmentation of the chunks of data so as to alleviate or substantially alleviate any undue delay servicing the memory operation that can be requested by an entity (e.g., a host). At this point, methodology 700 can end.

Figure 8:
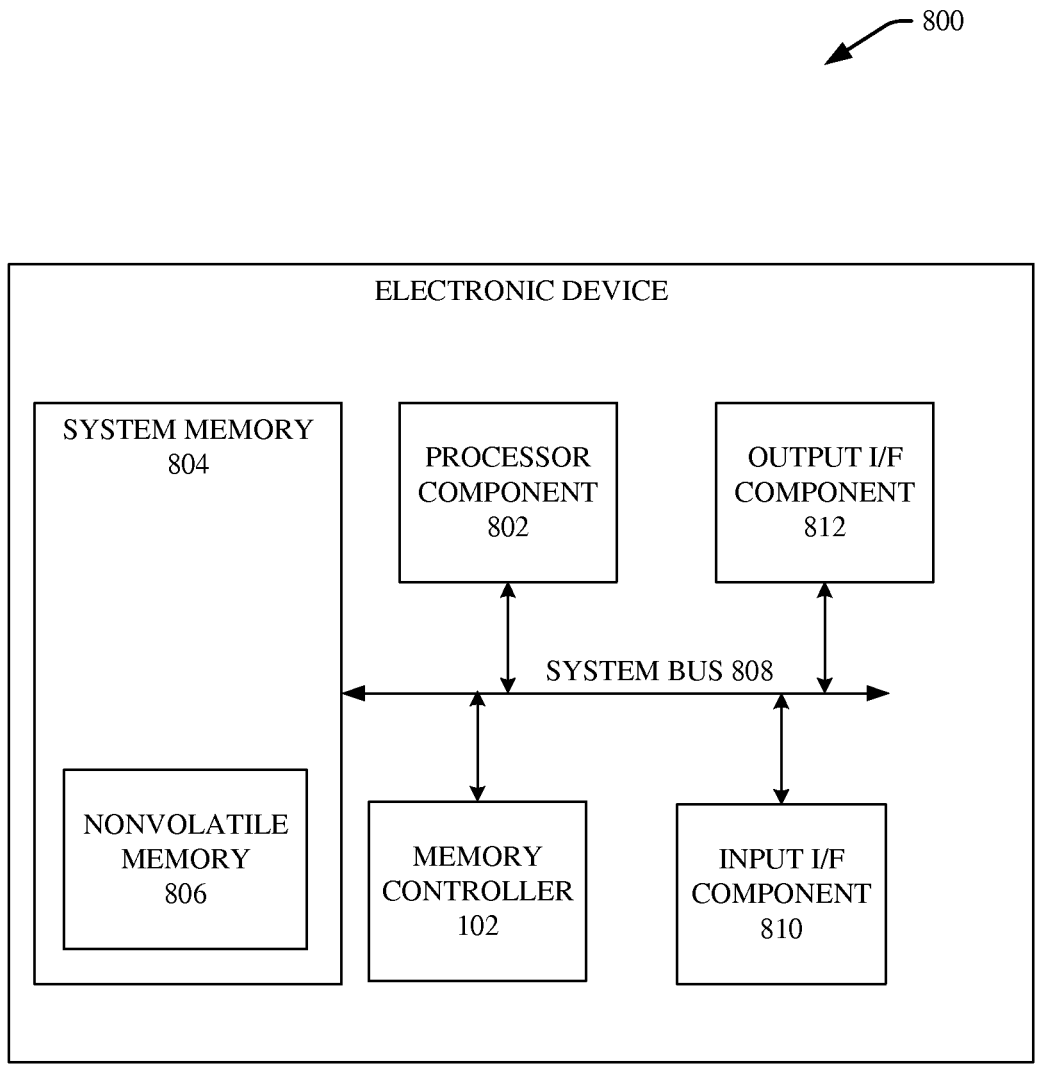
FIG. 8 illustrates an example of an electronic device that can be associated with a memory in accordance with an aspect of the disclosed subject matter.

Referring to FIG. 8, illustrated is a block diagram of an exemplary, non-limiting electronic device 800 that can comprise and/or incorporate systems and methodologies as described herein (e.g., system 100, system 200, system 300, etc.), or a respective portion(s) thereof. The electronic device 800 can include a memory controller component 102 that can facilitate caching LBA to PBA translation respectively associated with LBAs based in part on predefined optimization criteria. It is to be appreciated that that the memory controller component 102 (and components contained therein and/or associated therewith (e.g., optimized BA lookup component 110)) can be the same or similar as, and/or can comprise the same or similar functionality as, respective components as more fully described herein, for example, with regard to system 100, system 200, system 300, etc.

The electronic device 800 can be and/or can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 800 can include, but are not limited to, a processor component 802, a system memory 804, which can contain a nonvolatile memory 806, and a system bus 808 that can couple various system components including the system memory 804 to the processor component 802. The system bus 808 can be any of several types of bus structures including a memory bus or memory controller, a peripheral bus, or a local bus using any of a variety of bus architectures.

Electronic device 800 can typically include a variety of computer readable media. Computer readable media can be any available media that can be accessed by the electronic device 800. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 806 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 800. Communication media typically embodies computer readable instructions, data structures, program modules or other data in a modulated data signal such as a carrier wave or other transport mechanism and includes any information delivery media.

The system memory 804 can include computer storage media in the form of volatile (e.g., SRAM) (not shown) and/or nonvolatile memory 806 (e.g., flash memory). In accordance with one embodiment of the disclosed subject matter, the system memory 804, or a portion thereof, can comprise, and/or can be the same or substantially similar to, and/or can comprise the same or substantially similar functionality as, the memory component 104 (e.g., as illustrated in FIGS. 1, 2, etc., and described herein). A basic input/output system (BIOS), containing the basic routines that can facilitate transferring information between elements within electronic device 800, such as during start-up, can be stored in the system memory 804. The system memory 804 typically also can contain data and/or program modules that can be accessible to and/or presently be operated on by the processor component 802. By way of example, and not limitation, the system memory 804 can also include an operating system(s), application programs, other program modules, and program data.

The nonvolatile memory 806 can be removable or non-removable. For example, the nonvolatile memory 806 can be in the form of a removable memory card or a USB flash memory drive. In accordance with one aspect, the nonvolatile memory 806 can include flash memory (e.g., single-bit flash memory, multi-bit flash memory), ROM, PROM, EPROM, EEPROM, and/or NVRAM (e.g., FeRAM), for example. Further, a flash memory can comprise NOR flash memory and/or NAND flash memory.

A user can enter commands and information into the electronic device 800 through input devices (not shown) such as a keypad, microphone, tablet, or touch screen although other input devices can also be utilized. These and other input devices can be connected to the processor component 802 through input interface component 810 that can be connected to the system bus 808. Other interface and bus structures, such as a parallel port, game port or a universal serial bus (USB) can also be utilized. A graphics subsystem (not shown) can also be connected to the system bus 808. A display device (not shown) can be also connected to the system bus 808 via an interface, such as output interface component 812, which can in turn communicate with video memory. In addition to a display, the electronic device 800 can also include other peripheral output devices such as speakers (not shown), which can be connected through output interface component 812.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure can also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those desiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates physical block address (PBA) and logical block address (LBA) translation in at least one memory component, comprising:
   the at least one memory component configured to execute at least one memory operation and includes a plurality of memory locations,
   a memory controller component configured to store LBA to PBA translations respectively associated with a subset of LBAs based in part on a predefined optimization criteria, wherein the optimization criteria comprises at least a number of times an LBA is presented to the memory controller component in association with the at least one memory operation;
   a defrag component configured to defragment a chunk of data having portions of data that are stored in nonconsecutive pages associated with the at least one memory component and store the portions of data in consecutive pages associated with the at least one memory component during time periods that overlap with execution of the at least one memory operation; and
   a block address cache component (BA cache component) configured to store LBA to PBA translation information associated with at least one LBA used to access the at least one memory component,
   wherein the defrag component reduces a size of the BA cache component that is associated with storage of the LBA to PBA translation information by aligning the portions of data in consecutive page locations and storing, in the BA cache component, a starting PBA page number associated with an LBA or a number of pages value.

2. The system of claim 1, the memory controller component facilitates determining attributes associated with an LBA to facilitate determining an LBA to PBA translation to facilitate access of the LBA or data associated therewith, wherein the memory controller component is configured to store an LBA to PBA translation when a number of times the LBA has been accessed meets or exceeds a number.

3. The system of claim 1, wherein the memory controller component retrieves the portions of data associated with the chunk of data without requiring separate PBA page information for each portion of the chunk of data.

4. The system of claim 1, further comprising a block address counter component (BA counter component) that tracks and stores information related to a number of times the at least one LBA is presented to the memory controller component in association with the at least one memory operation.

5. The system of claim 1, further comprising a block address timer component (BA timer component) that stores time information related to an amount of time that has passed since the at least one LBA has been presented to the memory controller component to perform the at least one memory operation.

6. The system of claim 5, the BA timer component utilizes at least one of a monotonically incrementing clock, a time stamp, or a clock that tracks time based in part on clock cycles associated with the memory controller component, or a combination thereof, to facilitate obtaining time information respectively associated with LBAs.

7. The system of claim 1, wherein the predefined optimization criteria further includes at least one of: an amount of time that has passed since the an LBA was presented to the memory controller component in association with a memory operation, a number of times within a predetermined period of time that a LBA was presented to the memory controller component in association with the at least one memory operation, or a size of data associated with a LBA that is presented to the memory controller component in association with the at least one memory operation.

8. The system of claim 1, wherein the defrag component performs a search of the at least one memory component to determine if chunks of data are stored in two or more non-consecutive pages associated with the at least one memory component.

9. The system of claim 8, wherein the defrag component works in conjunction with a wear leveling component to determine where the chunks of data are to be stored in consecutive pages associated with the at least one memory component.

10. The system of claim 8, further comprising an optimized block address lookup component (BA lookup component) that facilitates the storage of a number of pages that is associated with the LBA to PBA translation information that corresponds to the number of consecutive pages in which the chunks of data are stored.

11. An electronic device that facilitates physical block address (PBA) and logical block address (LBA) translation in at least one memory component, comprising:
    the at least one memory component configured to execute at least one memory operation and includes a plurality of memory locations,
    a memory controller component configured to store LBA to PBA translations respectively associated with a subset of LBAs based in part on a predefined optimization criteria, wherein the optimization criteria comprises at least a number of times an LBA is presented to the memory controller component in association with the at least one memory operation;
    a defrag component configured to defragment a chunk of data having portions of data that are stored in nonconsecutive pages associated with the at least one memory component and store the portions of data in consecutive pages associated with the at least one memory component during time periods that overlap with execution of the at least one memory operation; and
    a block address cache component (BA cache component) configured to store LBA to PBA translation information associated with at least one LBA used to access the at least one memory component,
    wherein the defrag component reduces a size of the BA cache component that is associated with storage of the LBA to PBA translation information by aligning the portions of data in consecutive page locations and storing, in the BA cache component, a starting PBA page number associated with an LBA or a number of pages value.

12. The electronic device of claim 11, wherein the electronic device is one of a computer, a laptop computer, a router, an access point, a media player, a media recorder, an audio player, an audio recorder, a video player, a video recorder, a television, a smart card, a phone, a cellular phone, a smart phone, an electronic organizer, a personal digital assistant (PDA), a portable email reader, a digital camera, an electronic game, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation device, a secure memory device with computational capabilities, a device with at least one tamper-resistant chip, an electronic device associated with an industrial control system, or an embedded computer in a machine, the machine comprising at least one of an airplane, a copier, a motor vehicle, or a microwave oven.

* * * * *